Feb. 20, 1940. J. A. GARDNER ET AL 2,191,276
KNIFE
Filed Dec. 21, 1936
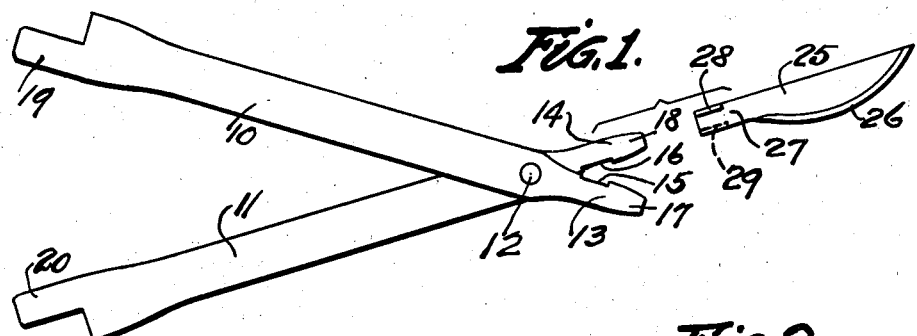
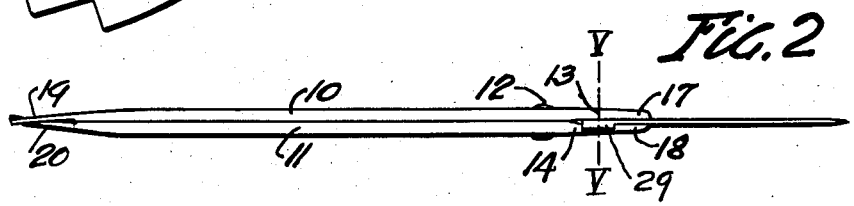
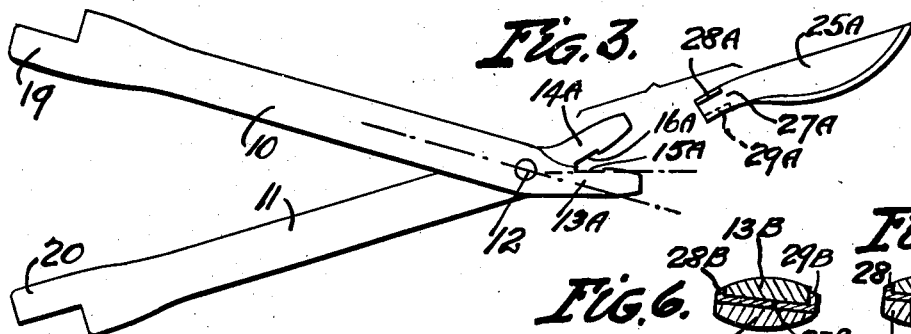
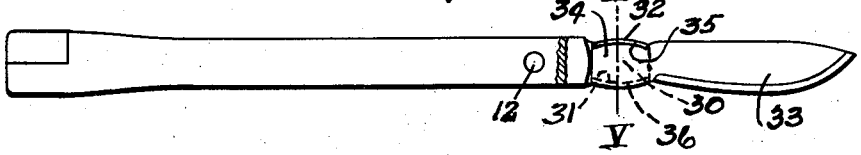
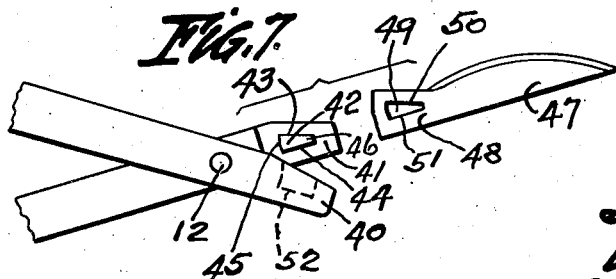
INVENTORS
JOSEPH A. GARDNER
DAVID S. GARDNER Patented Feb. 20, 1940

2,191,276

UNITED STATES PATENT OFFICE 2,191,276

KNIFE

Joseph A. Gardner, Memphis, and David S. Gardner, Bolivar, Tenn.

Application December 21, 1936, Serial No. 117,014

10 Claims. (Cl. 30—330)

This invention relates to improvements in knives which comprise a handle and interchangeable blades therefor; and more especially to such knives for surgical use.

In surgical operations it is of extreme importance that very sharp knives be used, that the blades should be shaped, so far as their cutting edges are concerned, for the particular operation for which they are to be used, and that they should be thoroughly sterilized before use.

It is also important in many operations that the alignment of the blades with respect to the handle be changed, often during the operation thereof, in order that cutting may be done around the under parts. The former of these conditions are more effectively met by the use of individual blades in connection with the handles, the blades being rigidly held in the handles, yet readily removed therefrom, and the latter condition is met by establishing angularity of the clamping jaws with respect to the remaining portion of the handle and a corresponding angularity of the shank portion of the blade with respect to the cutting portion thereof, whereby in one position the blade will be in alignment with the handle and in the reverse position the blade will be at a substantial angle with respect to the alignment of the handle.

The objects of the present invention are:

1st. To make a handle and a complementary insertable blade therefor, which may be rigidly locked together;

2nd. To make a handle and a complementary insertable blade therefor, which may be rigidly locked together, at option, in either of two alignments with reference to each other;

3rd. To make a handle having jaw portions shaped and positioned to accomplish such results; and 4th. To make a blade having shank portions complementary to the handle jaws, whereby such results may be accomplished.

The means by which the foregoing and other objects are accomplished and the manner of their accomplishment will readily be understood from the following specification, on reference to the accompanying drawing, in which—

Fig. 1 is a side elevation of one form of the handle, with the blade therefor shown detached.

Fig. 2 is an edge elevation of the same handle, with the blade in place.

Fig. 3 is a side elevation of a modified form of the handle with the jaws angularly positioned with reference to the gripping portion thereof and with a complementary blade shown detached therefrom.

Fig. 4 is a side elevation of a form of handle and blade, in which the shape of the interlocking portions of the blade shank and handle jaws have been modified from those first shown.

Fig. 5 is a cross section taken as on the lines V—V of Figs. 2 and 4, showing the preferred form of cross section of the interlocking portion of the blade shank and the complementary section of the jaws, together with an angular relation of the proximate faces of the jaws to the hinge pin of the tool.

Fig. 6 is a similar section taken as on the same lines, showing a modification of the form of the blade shank edges and the complementary form of the jaws.

Fig. 7 is a side elevation of the jaw portion of a modified form of a handle and blade, the handle and blade being shaped to provide, upon reversal, for two variations in the alignment of the blade with respect to the handle.

Referring now to the drawing in which the various parts are indicated by numerals, and particularly to Figs. 1 and 2, the handle comprises two elongated flattened grip members or grip portions 10 and 11, pivotally secured together, as by a rivet 12, the handle parts both extending forwardly beyond the rivet and being provided respectively with integral blade holding jaws 13, 14, respectively. The proximate edges of these jaws, as they close in gripping the knife blade, are provided respectively with notches 15 and 16, the end portions 17 and 18 of these jaws preferably extending well beyond these notches. The opposite ends of the grip portions of the handle are preferably halved to form complementary locking end portions 19 and 20, respectively, the outer ends of these portions being twisted inward so that when forced past each other they interlock to hold the handles closed.

25 is a blade preferably made of thin flat steel and having a cutting edge 26 shaped and sharpened as may be desired. The blade 25 has an integral shank 27, which shank has upwardly and downwardly turned edge portions or lugs 28 and 29, preferably adjacent the end of the shank. The lug 28 is preferably of the same length as the notch 15 of the shank 13 and is preferably adapted to fill this notch laterally as well, and the lug 29 is similarly complementary to the notch 16 of the jaw 14. The width of the blade shank 27 and particularly the distance between the facing portions of the lugs 28 and 29, as related to the width in closed position of the jaws 13 and 14, is such that the lug 28 is seated tightly in the notch 15 and the lug 29 tightly in the notch 16, when the handle is closed and the handle end portions are interlocked, thus laterally gripping the blade firmly.

The spacing of the proximate faces of the jaws 17 and 18 is also such that when the handle is closed these jaws bear firmly against the faces of the blade shank 27 and the extending portions 17 and 18 of the jaws extend this firm support, the jaws thus firmly gripping the blade both laterally and edgewise.

In Fig. 3 the grip portions 10 and 11, the end portions 19 and 20 and the pivot 12 are identical with those above described. The jaws 13A and 14A and the notches 15A and 16A therein are similarly shaped to those before described, but these jaws are bent edgeways out of alignment with their respective grip portions, the angularity in both being the same. Similarly the shank 27A of the blade is bent edgeways out of alignment with the blade portion 25A, though the lugs 28A and 29A are identical with those previously described. In this form of the blade and handle, the blade, when positioned as shown in Fig. 3 and placed in and gripped by the handle jaws, is in substantial alignment with the handle; whereas, when inverted its angularity is added to the angularity of the jaws and the blade is at a substantial angle to the grip portion of the handle.

Fig. 5 shows an enlarged cross section of the blades and jaws of Figs. 1 to 4 inclusive. In all of these the edge portion or lug 28 extends in one direction (shown upward) from the face of the shank 27, and the edge portion or lug 29 extends in the opposite (shown downward) direction therefrom. It will be understood, however, that as shown in Fig. 6, both lugs 28B and 29B may extend in one direction from the face of the blade shank 27B. In such case, however, one of the jaws, as jaw 13B, is notched on both sides; whereas the other jaw, as the jaw 14B, need have no notches unless these jaws be at an angle, as shown in Fig. 3, in which case both jaws would be notched on both sides in order that the blade might be inverted.

In Figs. 5 and 6 it will also be seen that the cross section of the blade shank 27, 27B, and the contacting faces of the jaws, are twisted with relation to the tops of the jaws 13, 13B, and the bottoms of the jaws 14 and 14B. In Fig. 5 the pivot pin 12 is dotted in with the axis 12A of the pin extended to show the corresponding angular relation of the pin with respect to the blade shank and the jaw faces. This angularity, while varying from ninety degrees a small amount only, is such that as the jaws close they grip not only the edges of the blade shank, but also solidly contact the faces of the shank. As shown the facing surfaces of the jaws are twisted with reference to the grip portions 10—11 of the handles. Obviously the shanks of the blades must have a complementary twist relatively to the blade proper, to preserve perfect alignment, about the longitudinal axis, of the blades and handles. However, it is the angular relation of the pin to the blade shank and facing surfaces of the jaws that governs, and the same result may be accomplished without twist of these shank and jaw portions, by giving the same angularity of the pin relatively to the facing surfaces of both grip and jaw portions of the handle. In any event, the construction is such that the jaws approach and contact the blade shank faces and edges, and in such approach any tendency of the jaws to improperly engage or hang upon the shank edges is eliminated. This is true even though the shank is not initially properly positioned, in which event the jaws will shift the shank into position, and close against the face of the shank, as well as against the edges thereof. Also, conversely, the jaws in opening clear the faces and edges of the shank, loosening the blade, so that when the jaws are open the blades drop freely from the handles.

In the modified form shown in Fig. 4 the upper jaw has been broken away, the lower only of the jaws 30 being shown. The jaws have curved side edges, 31, 32, the facing edges of the upper jaw (not shown) and the lower jaw, in closing being of identical conformation. 33 is a blade having a shank 34, which has an upwardly extending edge or lug 35 and an opposite, downwardly extending edge or lug 36. the curvature of these edges is complementary to the curvature of the blade jaws, it being understood that the curvature of the jaws and of the blade edges is for the purpose of engaging the blade against longitudinal displacement with respect to the handle, and in this respect is a deformation similar to the lugs 28 and 29, and that substantially any other symmetrical deformation of the side edges of the jaws and complementary deformation of the edge portions of the blade shank, which would accomplish such resistance to longitudinal displacement of the blade relative to the handle would also be substantial equivalent thereof.

It will be understood that the distance between the inner side of the lug 35, and the inner side of the other lug 36 of the shank is such that, as before, closing of the jaws of the handle will cause these jaws to tightly grip against such edge lugs.

It will further be understood that both lugs may extend from the same face of the shank, as shown on Fig. 6, if it be so desired, but that in such case, as there shown, at least one of the blade jaws must be narrowed, so that it will snugly fit between the thus turned lugs.

In Fig. 7, handle jaws 40, 41 are shown extending as before beyond the pivot 12. Projecting from one only of these jaws, is a lug 42, which is substantially of triangular form, the two side edges 43, 44 of this lug being of equal length, and these side edges being disposed at different angles to the longitudinal axis of the handle. One side edge 44 is here shown substantially parallel with the axis and the other side edge 43 at a substantial angle to the axis. The bottom 45 of these lugs is shown as comprising two halves extending respectively at right angles to the side edges 43, 44, but may extend straight between the bottom ends of these sides. The apex 46 of the lug may, if desired, extend to a sharp point, but preferably is truncated as shown. Preferably the lug is a truncated pyramid having the base described, the pyramidal shape causing the blade to tighten as forced down against the jaw. 47 is a blade having a thin flat shank 48, in which is formed a hole 49 which is complementary to the lug 42, the side edges 50, 51 of this hole being of equal length to conform to the equal length sides of the lug, and being aligned with respect to the axis of the blade in substantially the same manner as the sides of the lug are aligned with respect to the axis of the handle.

It will be seen that if the blade, as here shown, is placed over the lug 42, the blade will be substantially aligned with the handle, but if the blade be inverted the hole therein will so engage the lug 42, that the axis of the blade will be at a substantial angle to the axis of the handle.

It will be understood that the depth of the lug 42 is preferably equal to the thickness of the blade, but that the lug may be made longer, providing the under face of the jaw 40 be chambered out as shown by the dotted lines 52, to permit such extension.

In use, the jaws of the handle are opened as shown in Fig. 1, the shank of the blade is inserted therebetween, and the handle closed until the end portions of the grips interlock. When thus closed the notched or otherwise deformed edges of the jaws, which face each other in closing, engage the complementary lug portion of the blade shanks and the facing surfaces of these jaws frictionally or positively engage the faces of the blade shanks, the portions of the jaws extending beyond the lugs providing additional support for the faces of the shank and blade.

After use the end portions of the grips are unlocked and the jaws opened to release the blade, this being possible without the necessity of touching the blade. It will particularly be noted that even if these grips be unlocked accidentally, the construction of the jaws and their frictional engagement with the blades makes release of the blade substantially impossible until the jaws are widely swung apart, so that accidental dropping of the blade during an operation is likewise substantially impossible.

What we claim is—

1. In a knife, a pair of handle members and a complementary detachable blade, said blade having a shank portion, each edge of said shank having a lug, said lugs extending each from a face of said shank; said handle members being pivotally secured together, and each having an integral jaw portion extending beyond said pivotal connection, said jaw portions being superposed, and having surfaces spaced apart to receive the shank end of said blade therebetween, each said jaw having a side edge notched to engage a said shank lug, said notched edges and lugs being complementary.

2. In a knife, a pair of handle members and a complementary detachable blade; said blade having a shank portion, each edge of said shank having a lug, said lugs respectively extending from opposite faces of said shank; said handle members being pivotally secured together, and each having an integral jaw portion extending beyond said pivotal connection, said jaw portions being superposed and the inner surfaces of at least one jaw being cut away to form a recess to receive the shank portion of a said blade therebetween, the edges of said jaws which approach in closing being notched each to engage a said lug, said notched edges and said lugs being complementary.

3. In a knife, a pair of handle members and a complementary detachable blade; said blade having a shank portion with opposite edge lugs, both extending from the same face thereof; said handle members being pivotally secured together and each having an integral jaw-portion extending beyond said pivotal connection, said jaw portions being superposed and the inner surface of at least one jaw being cut away to permit insertion of the shank end of said blade between the jaw surfaces, the edge of said jaws being notched each to engage a said lug.

4. In a knife, a pair of handle members and a complementary detachable blade having a shank portion, said shank portion having its opposite edges provided with shoulders respectively extending substantially at right angles each from a face of said shank to form a shoulder; said handle members being pivotally secured together, and each having an integral jaw portion extending beyond said pivotal connection, said jaw portions superposing in closing, and having surfaces spaced to receive said shank portion therebetween, said blade shank shoulders and the edges of said jaws being complementary and each having a portion relatively displaced with respect to other edge portions.

5. In a knife, a pair of handle members and a complementary detachable blade having a shank portion, said shank portion having its opposite edges provided with shoulders, respectively off-set from opposite faces of said shank portion, said handle members being pivotally secured together, and each having an integral jaw portion extending beyond its said pivotal connection, said jaw portions being superposed and having their facing surfaces spaced to receive said shank portion, the edges of said jaws being complementary to said shoulders and having each a portion displaced with respect to other edge portions, to interact with said shoulders against relative longitudinal displacement of said blade and said jaws.

6. In a knife, a pair of handle members, and a complementary detachable blade having a shank portion, said shank portion having its opposite edges provided with portions off-set both from the same face of the shank to form shoulders, said handle members being pivotally secured together, and each having an integral jaw portion extending beyond said pivotal connection, said jaw portions being superposable, and having their facing surfaces spaced to receive said shank portion therebetween, the edges of at least one of said jaws being complementary to said shoulders, and having portions relatively displaced with respect to other edge portions and adapted to interact with said shoulders against relative longitudinal displacement of said blade and jaws.

7. In a knife, a pair of handle members pivotally secured together, and each having an integral jaw portion extending beyond said pivotal connection, said jaw portions being superposed and having blade contacting surfaces spaced as to receive therebetween a complementary knife blade, said surfaces being substantially flat throughout their entire width, including the edges thereof, the edges of said jaws which approach in closing each having a notch cut therein, said notches being spaced from the ends of said jaws.

8. A knife handle comprising a pair of superposed handle members pivotally secured together, and each having an integral jaw portion extending beyond said pivotal connection, said jaw portions being superposed and having their facing surfaces spaced apart as to receive the shank portion of a knife blade therebetween, said facing surfaces being substantially flat throughout their entire width including the edges thereof, the edges of said jaws which approach in closing each having a portion relatively protruding with respect to other edge portions to resist relative longitudinal displacement as of complementary shoulders projecting laterally as from a said blade shank.

9. A knife handle comprising a pair of superposed handle members pivotally secured together and each having an integral jaw portion extending beyond said pivotal connection, said jaw portions being superposed, and their proximate surfaces spaced as to receive a blade shank therebetween, said surfaces being so inclined transversely to their width and to said pivot as to approach in closing.

10. A knife handle, in accordance with claim 7 in which the said facing surfaces are so inclined transversely to their width and to their pivotal connection, as to approach in closing.

JOSEPH A. GARDNER.
DAVID S. GARDNER.